US009239337B2

(12) United States Patent
Mueller et al.

(10) Patent No.: US 9,239,337 B2
(45) Date of Patent: Jan. 19, 2016

(54) ULTRASONIC TRANSDUCER FOR USE IN A FLUID MEDIUM

(75) Inventors: Roland Mueller, Steinheim (DE); Gerhard Hueftle, Aspach (DE); Michael Horstbrink, Stuttgart-Feuerbach (DE); Tobias Lang, Stuttgart (DE); Sami Radwan, Stuttgart (DE); Bernd Kuenzl, Schwieberdingen (DE); Roland Wanja, Markgroeningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 550 days.

(21) Appl. No.: 13/501,675

(22) PCT Filed: Sep. 9, 2010

(86) PCT No.: PCT/EP2010/063236
§ 371 (c)(1),
(2), (4) Date: Jun. 25, 2012

(87) PCT Pub. No.: WO2011/051040
PCT Pub. Date: May 5, 2011

(65) Prior Publication Data
US 2012/0260742 A1  Oct. 18, 2012

(30) Foreign Application Priority Data

Oct. 29, 2009  (DE) .......................... 10 2009 046 146

(51) Int. Cl.
*G01F 1/66* (2006.01)
*G01P 5/24* (2006.01)
*G10K 11/00* (2006.01)

(52) U.S. Cl.
CPC . *G01P 5/24* (2013.01); *G01F 1/662* (2013.01); *G10K 11/004* (2013.01); *Y10T 29/42* (2015.01)

(58) Field of Classification Search
CPC .......... G01F 1/662; G10K 11/004; G01P 5/24
USPC ........................ 73/644, 617, 861.18; 29/25.35
See application file for complete search history.

(56) References Cited

U.S. PATENT DOCUMENTS 3,710,792 A * 1/1973 Light ............................ 600/457
4,059,098 A * 11/1977 Murdock ....................... 600/437
(Continued)

FOREIGN PATENT DOCUMENTS

CA  2331536  7/2002
CN  101033992  9/2007
(Continued)

OTHER PUBLICATIONS

International Search Report, PCT International Application No. PCT/EP2010/063236, dated Nov. 8, 2010.

*Primary Examiner* — Laura Martin
*Assistant Examiner* — Rose M Miller
(74) *Attorney, Agent, or Firm* — Kenyon & Kenyon LLP

(57) ABSTRACT

An ultrasonic transducer for use in a fluid medium is proposed. The ultrasonic transducer includes at least one transducer core which has at least one acoustic/electric transducer element, in particular a piezoelectric transducer element. The ultrasonic transducer furthermore includes at least one housing, at least one housing opening being at least partially sealed against the fluid medium with the aid of a sealing film which is connected to the transducer core. The sealing film has at least one expansion deformation which is configured to permit a relative movement between the transducer core and the housing.

14 Claims, 3 Drawing Sheets

(56) References Cited

U.S. PATENT DOCUMENTS

| | | | |
|---|---|---|---|
| 4,637,256 A * | 1/1987 | Sugiyama et al. | 73/633 |
| 5,239,223 A * | 8/1993 | Miyoshi | 310/328 |
| 5,272,797 A | 12/1993 | Miyoshi | |
| 6,058,786 A | 5/2000 | Wallén et al. | |
| 7,255,678 B2 * | 8/2007 | Mehi et al. | 600/446 |
| 7,956,516 B2 * | 6/2011 | Hayashi et al. | 310/334 |
| 2010/0154560 A1 | 6/2010 | Mueller et al. | |
| 2011/0314933 A1 | 12/2011 | Mueller et al. | |

FOREIGN PATENT DOCUMENTS

| | | |
|---|---|---|
| CN | 101385391 | 3/2009 |
| DE | 102007010500 | 9/2008 |
| DE | 102008055116 | 7/2010 |
| DE | 102008055126 | 7/2010 |
| EP | 0442278 | 8/1991 |
| EP | 442278 A1 * | 8/1991 |
| EP | 0897101 | 2/1999 |
| EP | 0945712 | 9/1999 |
| EP | 1416255 | 5/2004 |
| JP | 10-206528 | 8/1998 |
| RU | 1772724 | 10/1992 |
| WO | WO 03/064979 | 7/2003 |
| WO | WO 2007/094184 | 8/2007 |

* cited by examiner

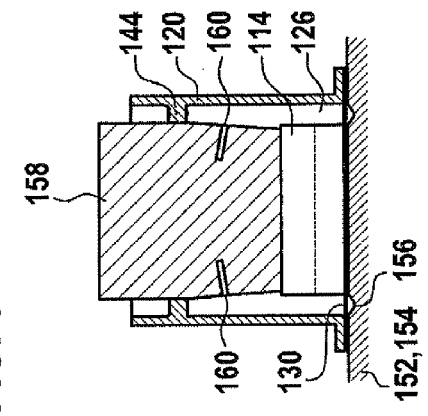
FIG. 4
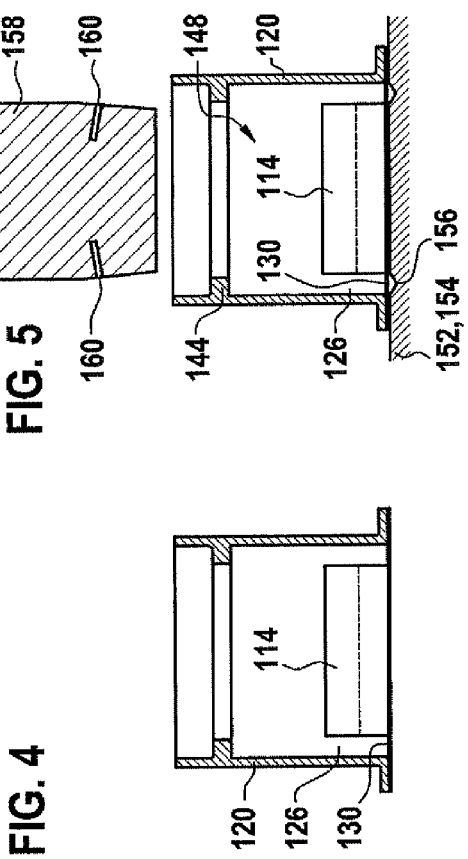
FIG. 5
FIG. 6
FIG. 7
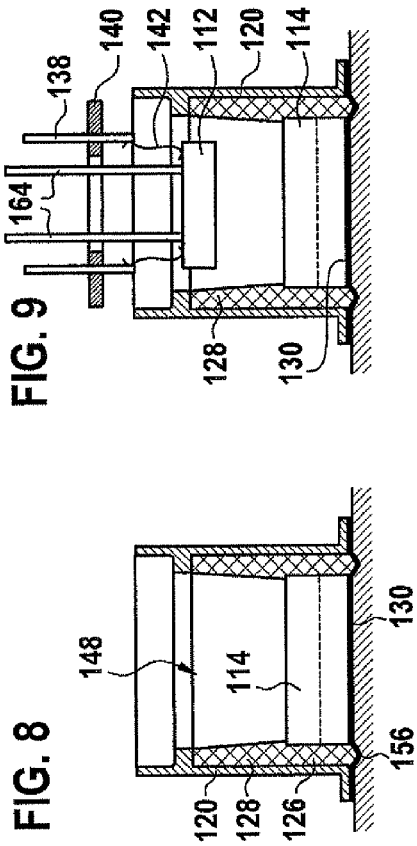
FIG. 8
FIG. 9

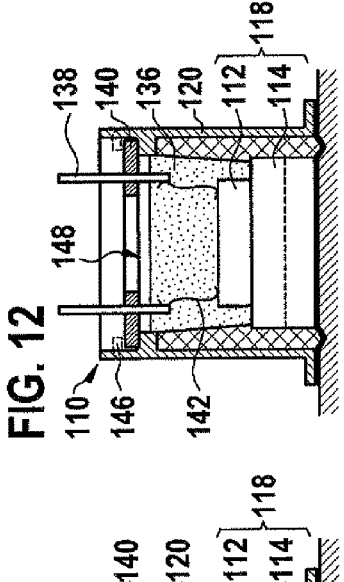
FIG. 10
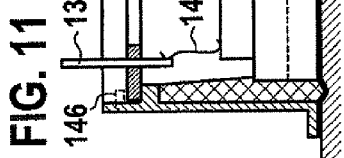
FIG. 11
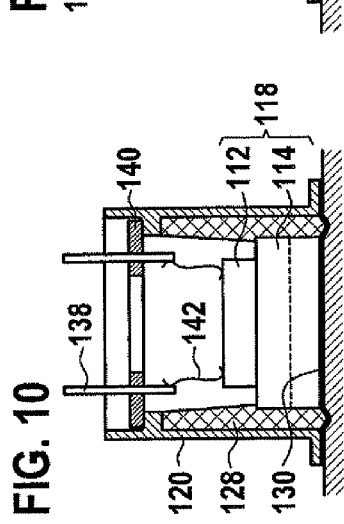
FIG. 12
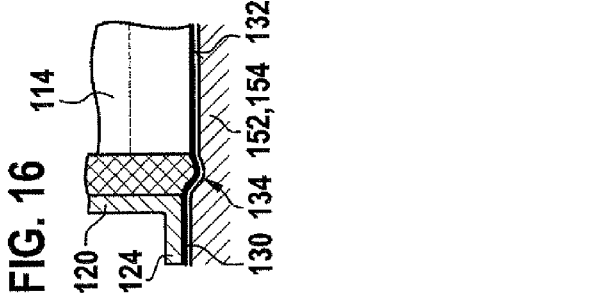
FIG. 13
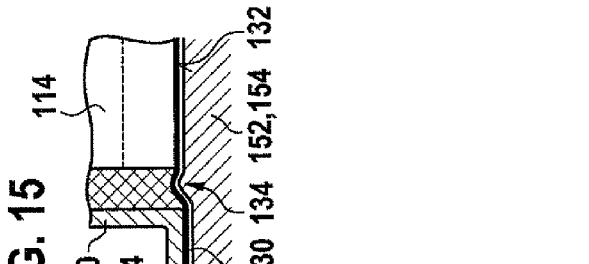
FIG. 14
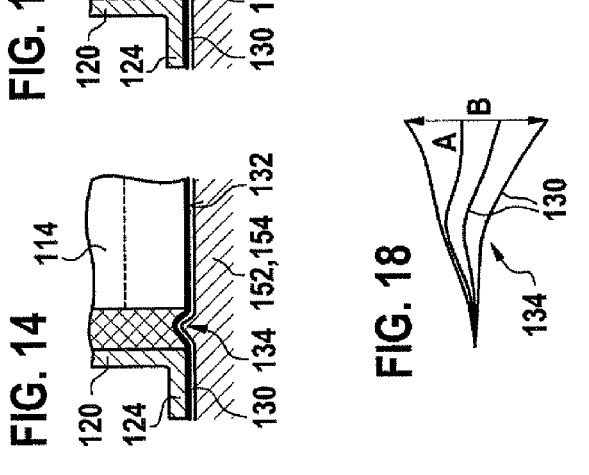
FIG. 15
FIG. 16
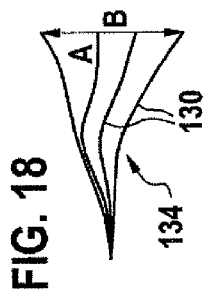
FIG. 18
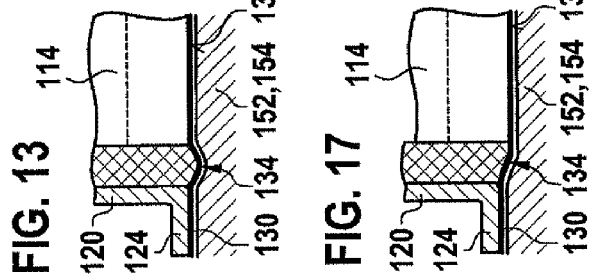
FIG. 17

ULTRASONIC TRANSDUCER FOR USE IN A FLUID MEDIUM

FIELD OF THE INVENTION

The present invention is directed to ultrasonic transducers which may be used, for example, in ultrasonic flowmeters in process engineering and/or the automotive industry, in particular in the intake system and/or exhaust system of internal combustions engines.

BACKGROUND INFORMATION

Ultrasonic transducers of this type are provided for measuring air flows; however, it is also possible, in principle, to use other fluid media, i.e., gases and/or liquids. Examples of ultrasonic transducers are described in German Patent Application No. DE 10 2007 010 500 A1 as well as in the references cited therein. In principle, the ultrasonic transducers described therein may also be modified and/or manufactured according to the present invention within the scope of the present invention. Ultrasonic transducers of the type described are provided, in particular, for measuring air flows, for example to derive an air volume signal within a system controller of an internal combustion engine.

As is described, for example, in German Patent Application No. DE 10 2007 010 500 A1, matching layers or matching bodies are used in many ultrasonic transducers to improve a noise radiation into the fluid medium and/or an absorption of ultrasound from the fluid medium. For example, ultrasonic transducers having noise-radiating resonance or matching bodies may have, for example, a metal diaphragm and/or a $\lambda/4$ impedance matching layer.

In ultrasonic transducers or ultrasonic flowmeters which must meet special pressure requirements, the noise-radiating surface is usually an integral part of a transducer housing or a flow tube, or it is hard-connected to these components, so that it is not usually possible to provide adequate decoupling against the propagation of structure-borne noise. If the decoupling against such noise is to be improved, a soft fastening material is needed. Due to the pressure requirements, however, this fastening and/or decoupling material must be supported on the housing, so that the thermal expansion, in turn, must have the greatest effect in the moving area of the noise-radiating surface. These compensating movements make it difficult to provide a media-tight transducer design.

Ultrasonic transducers in which a damping element, for example a damping casting, is inserted between the housing and a transducer core which has a piezoceramic transducer element, is described in German Patent Application Nos. DE 10 2008 055 126.0 and DE 10 2008 055 116.3. In general, elastomers, such as O rings or silicone molded parts, are frequently used for decoupling structure-borne noise. In and of themselves, however, these approaches do not usually offer sufficient media resistance for the installation situation, in particular, in motor vehicles. For example, silicone may swell and/or bleed under the influence of moisture and/or hydrocarbons, and gaps may form between the silicone and the surrounding area. As a result, sealing elements, for example in the form of vapor-deposited coatings, for example parylenes or sealing films, are frequently used for sealing ultrasonic transducers. The use of sealing films is also described, for example, in German Patent Application No. DE 10 2008 055 116.3. However, the disadvantage of pure coatings often lies in a poor mechanical cohesion of the coating, in particular under shearing loads, which occur in transition zones between different base materials. For example, the decoupling material may shift in relation to the impedance matching layer or the transducer housing under mechanical or thermal load, so that the coating may crack on this side. When using films, in many cases, thermal and mechanical stresses result in at least in an expansion load on the film, so that the film itself or its adhesion is severely stressed.

SUMMARY

An ultrasonic transducer for use in a fluid medium as well as a method for manufacturing an ultrasonic transducer are provided. An ultrasonic transducer in accordance with the present invention may be manufactured, in particular according to the provided method, and the method may be used to manufacture an ultrasonic transducer according to the present invention. Accordingly, reference may be made to the description of the different specific embodiments of ultrasonic transducers in accordance with the present invention for possible embodiments of the method and vice versa. However, other embodiments are also possible.

The example ultrasonic transducer includes at least one transducer core having at least one acoustic/electric transducer element. An acoustic/electric transducer element is understood to be, in principle, a transducer element which is configured to convert acoustic signals, for example ultrasonic signals, into electrical signals and vice versa. In particular, the acoustic/electric transducer element may include at least one piezoelectric transducer element, for example having at least one piezoceramic. In addition, the transducer core may include other elements, for example at least one matching layer and/or one matching body for the purpose of at least partially matching the impedance between the acoustic/electric transducer element and the fluid medium. With regard to the possible embodiments of matching elements of this type, reference may be made to German Patent Application Nos. DE 10 2007 010 500 A1, DE 10 2008 055 116.3 or DE 10 2008 055 126.0. The matching bodies and/or matching layers and/or matching elements illustrated therein, the term matching body being generally used below for elements of this type, may also be used in a transducer core in the example ultrasonic transducer of the present invention. The transducer core may have, in particular, a cylindrical shape, for example the shape of a circular cylinder and/or a cylinder having a polygonal cross section. However, other embodiments are also possible.

The example ultrasonic transducer furthermore includes at least one housing. For example, the housing may be a plastic housing and/or a metallic housing. This housing may completely or partially surround the transducer core. For example, the housing may have a cylindrical shape, including a housing interior in which the transducer core is accommodated. The housing includes at least one housing opening toward the fluid medium. For example, a radiation surface of the transducer core, i.e., a surface via which acoustic signals are transmitted from the transducer core to the fluid medium or which may absorb acoustic signals therefrom, may have which faces this opening and/or is situated within this opening.

To shield the housing interior of the ultrasonic transducer against undesirable influences of the fluid medium, for example temperature and/or pressure influences and/or media influences, the at least one housing opening may be at least partially sealed by at least one sealing film which is connected to the transducer core. The opening is preferably completely sealed by the at least one sealing film. The sealing film may be connected to the transducer core, for example, in such a way that a radiation surface of the transducer core rests on this sealing film over a wide area. For example, the radiation surface may be designed to be flat and be in contact with the sealing film, for example connected thereto, in particular by an integral joint, for example an adhesive bond. The sealing film may furthermore also be connected to an edge of the housing which surrounds the housing opening, for example it may be also connected thereto in a form-locked manner, in particular glued thereto. A sealing film is understood to be, in principle, any film which is at least partially impermeable to the fluid medium. A film is generally understood to be a flexible or deformable element whose lateral extensions substantially exceed its thickness, for example by a factor of at least 10, preferably by a factor of at least 100 or even by a factor of 1,000. For example, a film of this type may have a diaphragm-like design. Accordingly, the sealing film may be designed, for example, as described in German Patent Application No. DE 10 2008 055 116.3. Other embodiments of the sealing film and possible materials are explained in greater detail below. The sealing film may include, in particular, a plastic material. In particular, one or more of the following materials may be used: polyetheretherketone (PEEK), polyphenylene sulfide (PPS), polyimide (in particular Kapton®), a liquid crystal polymer (LCP), fluorocarbons such as Teflon or polytetrafluoroethylene (PTFE) or for example, perfluoroethylene propylene copolymer (FEP), polyethylenenaphthalate (PEN). However, other materials may also be used, for example high temperature-resistant thermoplastic plastic materials. In principle, however, other materials may also be used for the sealing film as alternatives or in addition, for example metallic materials, in particular metal films. The sealing film may furthermore also include an adhesive layer. In particular, the sealing film may have a thickness of no more than 50 µm, preferably no more than 25 µm.

As described above, a problem arises when using films for sealing purposes, in that thermal and mechanical loads may result in an expansion load which may stress the film itself or its fixing, for example its adhesion to the transducer core and/or the housing. To solve this problem, it is proposed that the sealing film have at least one expansion deformation, the expansion deformation being configured to permit a relative movement between the transducer core and the housing. In principle, the expansion deformation thus has an effect which is similar to that of a bellows, or it may even be at least partially designed as a bellows of this type. For example, the expansion deformation may have a deformation which includes a bending of the sealing film, for example a bending from an otherwise largely flat design of the sealing film. An expansion deformation may be understood to be, in principle, any deformation of the sealing film which is capable of permitting a relative movement between the transducer core and the housing, in particular also in a lateral direction, i.e., parallel to the surface of the sealing film. In particular, the expansion deformation may be designed to absorb a pressure load as well as a tensile load as well as a shearing load parallel to the sealing film and to compensate these loads within certain limits due to its deformation from the general extension plane of the sealing film. For example, the expansion deformation may include an expansion fold and/or a crimp fold, i.e., any fold and/or warping which is able to absorb a pressure load as well as a tensile load as well as a shearing load. The expansion deformation may have, in particular, at least one of the following deformations: an expansion fold extending into the fluid medium; an expansion fold extending into a housing interior of the housing; a bellows; a step-like deformation, a first plane of the sealing film being transferred to a second plane of the sealing film in the step-like deformation. Different embodiments are described below by way of example.

The at least one expansion deformation may preferably be designed in such a way that it is situated outside the transducer core and outside the housing. At least one gap, for example an annular gap, may be provided between the housing and the transducer core, for example. The expansion deformation may be provided at least partially, preferably completely, in the area of this gap. For example, the housing may have an edge which surrounds the housing opening, a radiation surface, for example a flat radiation surface, being situated within this edge and preferably completely surrounded by this edge. The gap may then be provided between the edge and the radiation surface. In this case, the sealing film may, for example, completely cover the housing opening, i.e., at least partially the edge, the gap and the radiation surface. The expansion deformation may then be provided in the area of the gap, for example in the form of an expansion fold or a bellows.

The sealing film may be integrally connected, in particular to the housing, for example to an edge of the housing in the area of the housing opening, and to the transducer core, in particular to a radiation surface of the transducer core. In particular, the sealing film may be glued to these elements. In principle, however, another connection to the elements is also possible, for example alternatively or additionally by a form-locked and/or force-fit connection. In particular at least one gap, in particular an annular gap, may be provided between the housing and the transducer core, as described above. This gap may preferably be at least partially filled with at least one decoupling element, the decoupling element being configured to dampen a transmission of structure-borne noise between the housing and the transducer core. For this purpose, the decoupling element may have, for example, a material, in particular a deformable material, and/or a material having a suitable filling, for example a filling of cavities and/or gas bubbles and/or deformable inclusions. For example, materials of a filling made of cavities and/or gas bubbles may optionally be used together with an additional filling made of other fillers. For example, an elastomer material or a soft thermoplastic material may be selected for the decoupling element. Different embodiments and examples of the decoupling element are explained below. The decoupling element may also be connected to the sealing film, in particular in the area of the expansion deformation. As illustrated below, the expansion deformation may be provided, in particular when the decoupling element is introduced into the gap, for example with the aid of an overpressure and/or an underpressure and/or an increased temperature of the decoupling element, at least during the introduction.

In addition to the ultrasonic transducer in one or multiple of the specific embodiments shown above, a method for manufacturing an ultrasonic transducer for use in a fluid medium is furthermore proposed, in particular an ultrasonic transducer according to one or multiple of the specific embodiments described above. In the example method according to the present invention, at least one transducer core having at least one acoustic/electric transducer element is introduced into at least one housing. At least one housing opening is at least partially sealed against the fluid medium using a sealing film which is connected to the transducer core. The sealing film is designed in such a way that it has at least one expansion deformation, the expansion deformation being configured to permit a relative movement between the transducer core and the housing.

At least one gap may be provided between the transducer core and the housing. This gap may be at least partially filled with at least one decoupling element. The decoupling element is configured to dampen a transmission of structure-borne noise between the housing and the transducer core. The expansion deformation may be at least partially provided when the decoupling element is introduced into the gap. This may be done, for example, with the aid of a high injection pressure, which is used in many cases, for example, for liquid silicone rubbers. Alternatively or additionally, the expansion deformation may also be entirely or partially generated at a different point in time. For example, the expansion deformation may also be created by shrinking the introduced decoupling element after introduction, for example after casting and/or injection. In particular, a shrinkage may occur during a curing and/or cross-linking and/or a cooling of the decoupling elements and/or a source compound of the decoupling element. For example, this may be done if silicone is used as the decoupling element. Alternatively or additionally, the expansion deformation may, in turn, be achieved, facilitated or at least supported either entirely or partially by a tool which is used for introducing the decoupling element, for example an injection molding tool or another type of mold. This may also be combined with the above-described options for generating the expansion deformation with the aid of an overpressure and/or a shrinkage of the decoupling element. For example, a generation of the expansion deformation with the aid of shrinkage may be supported by a tool bottom in which no indentation but rather an annular elevation is provided, which is pressed into the gap between the matching body and the transducer housing before and/or during and/or after casting, curing or cooling. A variety of other embodiments is also possible and achievable for those skilled in the art on the basis of this description.

For example, to introduce the decoupling element, a deformable compound, for example a source material for forming the decoupling element (for example, a precursor of the decoupling element), in particular at least one flowable compound, may be cast and/or pressed and/or injected into the gap. For example, a conventional injection molding process and/or an injection pressing process and/or a conventional casting process may be used for this purpose. This process may also be carried out under the application of an increased pressure and/or an increased temperature.

It is particularly preferable if the decoupling element includes a silicone, in particular a liquid silicone rubber. Liquid silicone rubbers (LSR) of this type are low viscosity and heat-vulcanized silicones having at least two components which are additively cross-linked. They may be introduced into the gap, for example in a shaping process which is also referred to below as the LSR process or LSR method. The components may be supplied to a mixing unit, for example in a multi-component mixing and dosing system, in particular under increased pressure. For example, a mixing in a ratio of 1:1 may take place. Other additives may also be mixed in. The mixed materials may then be injected into a heated die, for example with the aid of an LSR worm gear unit. The infeed unit, for example the LSR worm gear unit, may be heated to a low temperature of, for example, 20° C. to 25° C. In the proposed method, the gap between the housing and the transducer element is also used instead of a die, it being possible to also heat this gap or its walls. The gap may also be evacuated before the reactive material mixture is injected. The LSR process is, in principle, conventional and may be advantageously used within the scope of the present invention to manufacture the decoupling element and, at the same time, to preferably immediately provide the expansion deformation during this manufacturing process.

The example ultrasonic transducer and the example method have numerous advantages over conventional ultrasonic transducers and methods. In particular, the stresses in the sealing film illustrated above may be effectively avoided. Deformed films or diaphragms in the area of sonic transducers are conventional, in principle from the area of loudspeaker technology. In this case, however, the diaphragm is usually formed around an active radiation surface in the form of a bead. This area is then itself used as a decoupling suspension. Due to the present invention, on the other hand, both the functions of the suspension of the transducer core and its ultrasonic decoupling are handled by the filled-in decoupling element, while the film is used only for protection against media and is not placed under load due to the deformation during the application of pressure and pressure deformation. The present invention therefore permits a media-resistant ultrasonic transducer to be implemented, which simultaneously includes decoupling of structure-borne noise and is sufficiently stable under pressure and heat for use under harsh conditions, for example in the intake system of a motor vehicle. Both the low pressure side and the supercharged side downstream from a turbocharger or a charge air cooler may be considered as the installation position. As part of an engine controller, the example ultrasonic transducer is suitable for detecting the air mass in gasoline and diesel engines in both passenger cars and commercial vehicles. In commercial vehicles, in particular, the installation position downstream from a charge air cooler is advantageous, this position, however, involving higher pressure and/or media requirements, for example pressure requirements up to 6 bar, a tightness against oil and exhaust gas components and the like. However, these requirements may be effectively met by the example ultrasonic transducer according to the present invention.

As illustrated above, the expansion deformation may be designed in different ways without impairing the tightness of the sealing film against pressure and/or media. This sealing film may thus have a reshaped design, that is, a non-flat design, for example according to one or more of the shapes illustrated above. Reshaping the sealing film may thus result, for example, in a type of simplified "bellows," which permits a relative movement of the transducer core to the housing without placing a load on the sealing film and/or its adhesion. The ultrasonic transducer may thus be subjected to high media, temperature and/or pressure loads, despite the soft, i.e., movable, decoupling. A target conflict between this loadability and an optimum coupling may also be resolved in this way.

In particular with the aid of the LSR process described above, but also with the aid of other manufacturing methods, in particular, for manufacturing a decoupling element, a decoupling element which may rest tightly against the deformed sealing film is made possible. In using a decoupling molded part which is introduced in its entirety into the gap, as is conventional, an air-filled transition between the decoupling material and the sealing film could conversely form which is compressible and thus stresses the film under the application of pressure. In this case, the pressure requirements described above, for example, would be difficult to meet. According to the present invention, this disadvantage is avoided, however, in particular by the fact that the decoupling element lies tightly against the sealing film or is even connected thereto, for example in a form-locked manner. In this way it is also possible to avoid the fact that air-filled cavities or areas without adhesion between the sealing film and the decoupling are filled with media or have such media applied to them, under alternating loads, for example by being pumped full. Due to the shaping process of the decoupling element, for example by the LSR process, the deformation itself may already be generated, since this process involves high temperatures and pressures. This would not be easily possible, for example, in conventional casting processes. Moreover, a casting process would result in substantially longer curing times, which are uneconomical in a large-scale production. Alternatively or additionally, however, the deformation may also be generated entirely or partially at another point in time, as already explained above, for example during a cooling and/or solidification and/or a cross-linking of the decoupling element.

The ultrasonic transducer may be configured in different ways. It may be advantageously designed for a frequency range from 100 kHz to 600 kHz and in particular from 200 kHz to 400 kHz, the latter, in particular, for a flow measurement in a motor vehicle. The ultrasonic transducer may be configured for air or gases as ambient media and/or for other types of fluid media. As illustrated above, the decoupling material may lie tightly against the back of the sealing film and/or even adhere thereto, for example with the aid of a form-locked connection. This form-locked connection may already be generated, for example, during the introduction of the decoupling element, for example the source compound for the LSR process, without a separate method step being required therefor. The decoupling element may be used as part of the fastening of the transducer core, for example a piezoelectric transducer and at least one impedance matching layer, and it may be designed for the purpose of absorbing and transferring compression forces acting upon the film. Accordingly, the sealing film is preferably not itself the diaphragm suspension, as in a loudspeaker, but instead is used only for sealing the housing interior. The relative movements to be compensated are not the acoustic oscillations which the ultrasonic transducer or the transducer core itself radiates or receives, since these oscillatory motions have amplitudes only in the magnitude of approximately 1 µm, but instead the relative movements are movements induced by pressure fluctuations or thermal expansion of the damping and decoupling materials used, which have much higher amplitudes, for example in a magnitude of 100 µm.

The example ultrasonic transducer may be comparatively easily implemented from a technological standpoint, for example using the method according to the present invention. The expansion deformation may be provided in the sealing film in advance, or it may be provided only during the manufacturing process. The reshaping of the film may take place, for example, prior to the introduction of the decoupling element, for example a decoupling material of the decoupling element, and/or by the introduction of the decoupling element or its material. The latter may be carried out, for example, by the LSR process, as illustrated above, which could be simultaneously used to press and thus deform the sealing film directly onto a die contour. An inverse process is also possible, in which the die contour supports a shrinkage, as described above.

The introduction of the decoupling element, for example a material of the decoupling element, may thus generally be combined with a shaping of the sealing film, for example with the aid of an external die into which the housing, the transducer core and the sealing film are placed and which has a corresponding contour for forming the expansion deformation. Different embodiments are possible.

BRIEF DESCRIPTION OF THE DRAWINGS

Exemplary embodiments of the present invention are illustrated in the figures and explained in greater detail below.

FIGS. 4 through 12 show method steps of a manufacturing method according to the present invention.

FIGS. 13 through 18 show different exemplary embodiments of geometric designs of expansion deformations according to the present invention.

DETAILED DESCRIPTION OF EXAMPLE EMBODIMENTS

Figure 1:
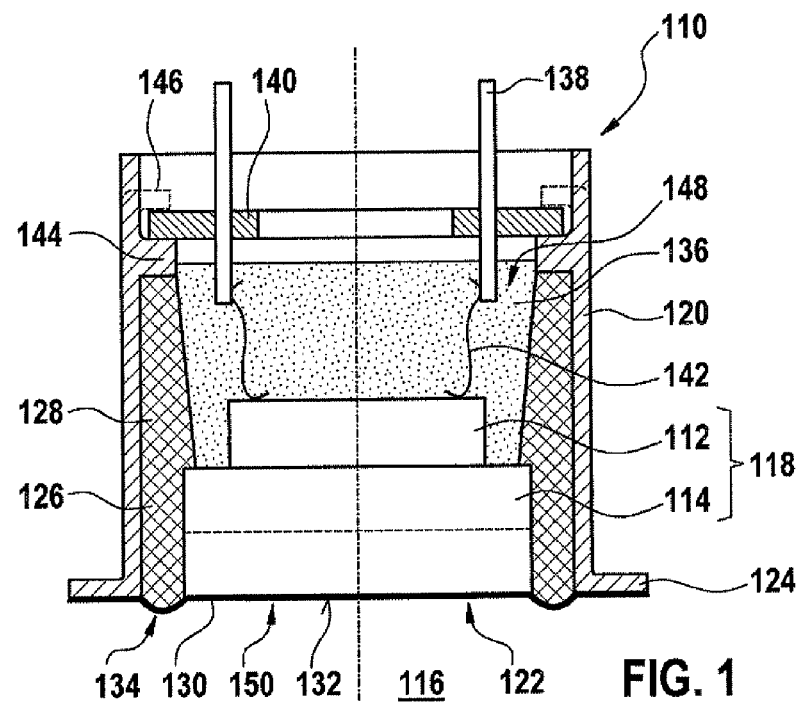
FIG. 1 shows a sectional representation of an exemplary embodiment of an ultrasonic transducer according to the present invention.

FIG. 1 shows a sectional representation of an exemplary embodiment of an ultrasonic transducer 110 according to the present invention, viewed from the side. In this exemplary embodiment, the ultrasonic transducer includes an acoustic/electric transducer element 112, for example in the form of a piezoceramic, as well as a matching body 114 situated on the radiation side of acoustic/electric transducer element 112. Matching body 114 is used to improve the acoustic coupling between acoustic/electric transducer element 112 and a fluid medium, which is identified symbolically in FIG. 1 by reference numeral 116. Accordingly, matching body 114 may, for example, at least partially carry out an impedance matching. Reference may be made to German Patent Application Nos. DE 10 2007 010 500 A1 as well as DE 10 2008 055 116.3 and DE 10 2008 055 126.0, which are mentioned above, for embodiments of matching body 114, which may be designed, for example, as a matching layer and which acts as a coupling element and which may also have a multilayer design. Matching body 114 and acoustic/electric transducer element 112 together form a transducer core 118.

In the illustrated exemplary embodiment, ultrasonic transducer 110 furthermore includes a housing 120, for example in the form of a sleeve. Housing 120 may be made, for example, entirely or partially of a metallic material or a plastic material. Housing 120 has a housing opening 122 on its side facing fluid medium 116, an edge 124 of housing 120 surrounding housing opening 122 in an annular manner, for example in the form of a circular ring and/or a polygonal ring. A gap 126 is provided between housing 120 and transducer core 118. In the illustrated exemplary embodiment, this gap 126 is partially filled with a decoupling element 128. This decoupling element 128 is used to at least dampen a transmission of structure-borne noise between housing 120 and transducer core 118 or vice versa.

Housing opening 122 is sealed against fluid medium 116 by a sealing film 130. In the illustrated exemplary embodiment, this sealing film 130 lies over the entire surface on what in the present case is a flat radiation surface 132 of transducer core 118 and is connected thereto, for example, detachably or via an integral joint, for example an adhesive bond. Sealing film 130 is furthermore connected to edge 124 and is also, for example, glued thereto. A coupling is established between transducer core 118 and fluid medium 116 via radiation surface 132, for example for radiating noise and/or for absorbing noise.

Sealing film 130 has an expansion deformation 134 in the area of gap 126. This expansion deformation 134, whose possible embodiments are explained in greater detail below, may surround transducer core 118 in an annular manner and thus form a deformation area. Expansion deformation 134 may permit a relative movement between the transducer core and the housing. In the illustrated exemplary embodiment, as explained in greater detail below, decoupling element 128 is designed in such a way that it rests directly upon radiation surface 132 in the area of expansion deformation 134 and is preferably connected thereto, for example with the aid of an integral joint, for example an adhesion. However, a connection of this type may also be created immediately when decoupling element 128 is introduced, for example according to the LSR method described below. In the exemplary embodiment illustrated in FIG. 1, decoupling element 128 is designed only in an annular manner so that a clearance remains above transducer core 118. In the illustrated exemplary embodiment, this clearance is filled with an additional damping material 136, for example a damping casting. Depending on the material composition and detailed configuration, damping material 136 may also be identical to decoupling element 128 and be mounted in the same process step either with a time offset or even simultaneously with decoupling element 128.

In the illustrated example, ultrasonic transducer 110 furthermore has contact pins 138 which are held in place by a cover 140 and which may be connected to acoustic/electric transducer element 112 via electrical supply lines 142. Alternatively or additionally, however, another type of electrical contacting of acoustic/electric transducer 112 is also possible in this and in other exemplary embodiments, for example a contacting via terminals, contact clips, soldered-on or welded-on wires or similar contacting elements. Cover 140 rests, for example, on a step 144 in housing 120. Cover 140 may be fixed, for example, by a flange 146 of housing 120, as explained in greater detail below.

Acoustic/electric transducer element 112 converts electrical signals into acoustic oscillations (transmit mode) or vice versa (receive mode). Acoustic/electric transducer element 112 is connected to matching body 114, which acts as a decoupling element which may largely include at least one material for acoustic impedance matching between fluid medium 116, for example air, and acoustic/electric transducer element 112. Matching body 114, which acts as a decoupling element, or partial sections of this element, may be simultaneously used, with the aid of special material properties, to reduce thermally induced twistings between matching body 114 and acoustic/electric transducer element 112, for example a piezoceramic. Transducer core 118 formed in this manner is fastened via decoupling element 128 in housing 120, which may be designed, for example, as a sleeve and which may have, for example, deep-drawn steel as the material. Alternatively, other metals or even plastics may also be used. Transducer core 118 is damped on the back by damping material 136, which may be entirely or partially identical to decoupling element 128, as described above.

Ultrasonic transducer 110 is closed on the back by cover 140, which may be designed, for example, as a cover ring. Cover 140 may also simultaneously fix contact pins 138, for example two contact pins, for example by clamping or injection. Cover 140 may be connected to housing 120, for example with the aid of a clamp connection, a screw connection, a bayonet connection, an adhesive joint or, as illustrated in FIG. 1, flange 146. Any force-fit, formed-locked and/or integral connecting method is generally possible. Electrical supply lines 142 establish the contact with acoustic/electric transducer 112 within housing 120, i.e., in a housing interior 148.

A front area of ultrasonic transducer 110 is covered by sealing film 130, which is preferably glued to matching body 114 and housing 120. For example, polyamide, in particular Kapton, PEEK, Teflon or another of the aforementioned polymer materials or another polymer material or combinations of the aforementioned and/or other polymer materials may be used as the film material for sealing film 130. Alternative or additionally, thin metal films would also be theoretically conceivable. The film thickness should preferably be approximately 50 μm, in particular in the magnitude of or even substantially less than 25 μm. A compromise must be reached between the best possible acoustic radiation in the normal direction toward radiation surface 132, the least possible propagation of structure-borne noise along sealing film 130 and the least possible media permeation.

In the exemplary embodiment illustrated in FIG. 1, sealing film 130 may have, for example, a largely flat main area 150, in particular in the area of radiation surface 132. Ultrasound is radiated or received via this main area 150. This main area 150 may be continued to the outside in the form of a mathematical plane. An area in which sealing film 130 is deformed in such a way that portions of sealing film 130 are located at a substantial distance from this mathematical plane lies outside flat main area 150. This is an exemplary embodiment of expansion deformation 134. For example, a distance from the plane of main area 150 in the magnitude of 100 μm or more may be viewed as a measure of a substantial deformation of this type. In general, expansion deformation 134 thus preferably has a magnitude of at least 100 μm in this or in other exemplary embodiments.

FIG. 18 shows a schematic representation of different curves of the area of expansion deformation 134 of sealing film 130. These curves again clarify what a substantial reshaping is understood to be and how it may be designed. For example, expansion deformation 134 may be designed in such a way that, in terms of dimensions, it includes at least one reshaping in the magnitude of the movement to be expected on the basis of temperature and/or pressure changes. In FIG. 18, the surface identified by A is enlarged compared to a flat film in an area of the film with the aid of the deformation process in such a way that this surface may remain largely the same, i.e., it has no or only a small expansion when transducer core 118 (not illustrated in FIG. 18) executes a corresponding axial movement, for example due to thermal expansion of materials within transducer core 118 and/or a pressure load. The axial movement is identified by B in FIG. 18.

In the exemplary embodiment in FIG. 1, radiation surface 132 of transducer core 118 is illustrated in a flat design by way of example. Other embodiments are also possible, in principle. For example, it is possible for the surface of matching body 114, for example of the impedance matching layer, or of the coupling element, to have a non-flat design itself. For example, it may be provided with one or multiple phases or be designed in the shape of a truncated cone. This makes it possible to positively influence the coupling behavior in the air chamber, for example with regard to the bandwidth, the radiation characteristic or other criteria. In this case, sealing film 130 does not have a flat main area. Nevertheless, an addition reshaping area may be provided in the region of the decoupling as expansion deformation 134 to relieve the load on sealing film 130 during movements of transducer core 118 in relation to housing 120.

Figure 2:
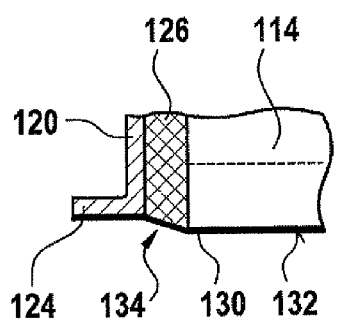
FIGS. 2 and 3 show different deformation states of an expansion deformation of the exemplary embodiment according to FIG. 1.
Figure 3:
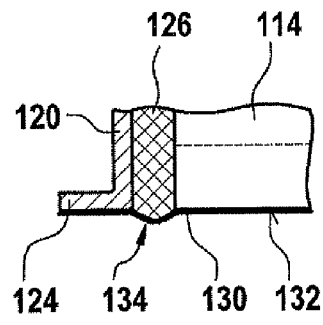

FIGS. 2 and 3 show a sectional representation of expansion deformation 134 of the exemplary embodiment according to FIG. 1 in different load states. If the deformation of sealing film 130 is pronounced at a certain temperature, for example as illustrated in FIG. 2, a geometry similar to the representation shown in FIG. 3 will set in at a certain higher counter-pressure or a certain lower temperature. However, the situation according to FIG. 2 may also occur while housing 120 is being filled with a damping or decoupling material (as explained in greater detail below) or while these materials are being cured under the application of heat.

FIGS. 4 through 12 show method steps of an exemplary embodiment of a manufacturing method for manufacturing an ultrasonic transducer 110. An ultrasonic transducer 110 according to the exemplary embodiment illustrated in FIG. 1 is manufactured by way of example. Accordingly, reference may be made to the above description of FIG. 1 with regard to the individual elements. It is also possible, in principle, to manufacture a different ultrasonic transducer 110 with the aid of the proposed method.

As a possible starting point within a process sequence, FIG. 4 shows an assembly which includes housing 120, sealing film 130 and matching body 114, which acts as the coupling element. As shown in FIG. 2, this assembly is inserted into a die 152. By way of example, it is assumed below that this die 152 is a die for an LSR process. In principle, however, other types of shaping processes may also be used, for example casting processes and/or injection processes and/or pressing processes in which at least one source material is shaped to manufacture a decoupling element 128. This die 152 is indicated only symbolically in FIG. 4. In addition, this die 152 may include other elements. In the illustrated exemplary embodiment, die 152 includes a first molded part 154, in which a negative profile 156 is provided in the area of expansion deformation 134 to be created, this negative profile being able to define the shape of later expansion deformation 134. For example, this negative profile 156 may have an indentation in the specified area, for example in the form of a groove, for example a groove having a rounded cross section, for example a parabolic or round cross section. Other shapes are also possible. In addition, die 152 may also include other molded parts which are not illustrated in the figures.

In the method step illustrated in FIG. 5, a stamp 158 is furthermore inserted into housing interior 148 of housing 120, it being optionally possible to simultaneously press housing 120 against first molded part 154. For example, stamp 158 may be lowered in such a way that it is sealed by the application of pressure against matching body 114, as illustrated in FIG. 6, and, on the circumference, against step 144 of housing 120 and/or a different type of bulge of housing 120, while housing 120 is pressed onto first molded part 154 together with sealing film 130. Stamp 158 may thus be part of die 152 and act as another molded part of this die 152. However, another embodiment is also possible, in principle. A deformable compound 162 is then injected through channels 160 into gap 126 between matching body 114 or stamp 158 and housing 120. This compound may be, for example, a precursor material from which decoupling element 128 is formed, for example with the aid of a chemical reaction and/or a physical phase transition. For example, this deformable compound may be liquid silicone rubber (LSR). The deformable compound is heated in die 152, thereby creating a high pressure. For example, a pressure from 100 bar to 200 bar may be created at a temperature of 200° C. This pressure simultaneously presses sealing film 130 into the contour of first molded part 154 in the area of negative profile 156. Sealing film 130 is reshaped and expansion deformation 134 is created.

The deformable compound may also be provided with additives, for example fillers or cavities. For example, an optimum decoupling of structure-borne noise and/or an optimum damping of structure-borne noise may be carried out in this manner. The properties of decoupling element 128 may be set in this manner. Silicone foams or admixtures of glass and/or plastic spheres and/or hollow spheres are particularly suitable. In particular, the latter, i.e., plastic spheres or hollow plastic spheres, are easy to thermally deform and result in particularly advantageous decoupling properties. A particularly easy method for admixing these spheres is to mix them into the resin component of the silicone before mixing with the curing component. Other possible ways to foam silicone, which are, however, usually more difficult to control, are physical or chemical methods. In the latter case, the foaming may even be carried out at the destination within gap 126.

After the injection operation illustrated in FIG. 7, stamp 158 is removed from housing interior 148 in a method step illustrated in FIG. 8. Acoustic/electric transducer element 112 is subsequently inserted in a method step illustrated in FIGS. 9 and 10. This may be done, for example, as an assembly, as illustrated in FIG. 9. In addition to acoustic/electric transducer element 112, this assembly may include, for example, contact pins 138 and electrical supply lines 142 as well as cover 140. Acoustic/electric transducer element 112, for example the piezoelectric transducer element, may be inserted, in particular, with the aid of vacuum grippers 164. Acoustic/electric transducer element 112 may be integrally connected, for example to matching body 114, for example, using a gluing method. Another type of assembly is also possible, in principle, for example a contacting of acoustic/electric transducer element 112 after the latter has been inserted into housing interior 148. However, the illustrated assembly method involving previously contacted acoustic/electric transducer element 112 is preferred. After acoustic/electric transducer element 112 has been introduced and fixed, cover 140 may be fixed, as illustrated in FIG. 11, for example with the aid of flange 146 described above or another type of fixing. Remaining housing interior 148 may subsequently be filled with damping material 136, as illustrated in FIG. 12. Finished ultrasonic transducer 110 may then be removed from first molded part 154 at this or another point in time.

As shown above, negative profile 156 may define the shape of expansion deformation 134, for example with the aid of its contour. A number of other variants of the reshaping contour are illustrated in FIGS. 13 through 17 by way of example. First molded part 154 of die 152 is also shown by way of example. In these exemplary embodiments, FIG. 13 shows an example in which expansion deformation 134 has an expansion fold extending into fluid medium 116, similarly or analogously to the exemplary embodiment shown in FIG. 1. FIG. 14, on the other hand, shows an exemplary embodiment in which an expansion fold extends into gap 126.

While radiation surface 132 in the exemplary embodiments in FIGS. 13 and 14 is situated on a plane with edge 124 of housing 120, the exemplary embodiment in FIGS. 15 through 17 show an offset of radiation surface 132 in relation to edge 124. This creates a step-like deformation, sealing film 130 being transferred from the plane of radiation surface 132 to the plane of edge 124 in the area of this step-like deformation. In the exemplary embodiment shown in FIG. 15, the plane of radiation surface 132 is offset from edge 124 into housing interior 148. In addition, as also shown in FIG. 15, another expansion fold which, in this case, also extends into housing interior 148, may be provided in the area of gap 126.

Conversely, FIG. 16 shows an exemplary embodiment in which the plane of radiation surface 132 is offset from edge 124 in the direction of fluid medium 116. In addition, as also shown in FIG. 16, another expansion fold which, in this exemplary embodiment, also extends into fluid medium 116 by way of example, may be provided in the area of gap 126. Finally, FIG. 17 shows an exemplary embodiment in which only one offset takes place, for example similarly to FIG. 16, however, without any further expansion fold being provided in addition to this step-like deformation. In this case, the step-like offset alone forms expansion deformation 134. As illustrated above, the step-like deformation may include an offset of the planes in a magnitude of at least 100 μm, preferably more. In particular, the contour in the exemplary embodiment according to FIG. 17 will usually change to such a great extend during cooling that approximately the same geometry as in the exemplary embodiment according to FIG. 3 or FIG. 13 occurs at room temperature, this geometry permitting an axial movement of transducer core 118 in both directions without substantially expanding sealing film 130.

The exemplary embodiments illustrated above, in particular the exemplary embodiment of the method according to the present invention in FIGS. 4 through 12, may be modified in different ways without thereby deviating from the basic idea of the present invention. For example, the reshaping of sealing film 130 may also take effect at a different point in time or in a different way, thus creating expansion deformation 134. For example, a reshaping may take place prior to gluing of film 130 to housing 120. Furthermore, a vacuum deep-drawing method and/or an autoclaving process may be used, for example, to create expansion deformation 134. A deep-drawing may also be carried out without a vacuum or air pressure, for example using a stretching frame and/or a molding tool, for example in the form of a hot stamping method. Alternatively or additionally, the reshaping may also take place during or after gluing. The reshaping may also take place after gluing, for example with the aid of the LSR process. The reshaping may also take place before and during the LSR process or the filling process. In these cases, it may be favorable, for example, to prestretch sealing film 130 before inserting it into die 152, it being possible to then carry out the final shaping, for example, with the aid of a second deformation during the filling process, for example during the LSR process. Sealing film 130 may also generally be used as a positioning aid. This may be implemented in a particularly easy manner, for example, if a pre-assembly having a centered configuration is used, as shown in FIG. 4, which includes housing 120, sealing film 130 and matching body 114. This makes it possible to ensure that at least the components of this pre-assembly no longer have to be positioned in relation to each other within what is already a complex filling process, for example the LSR process.

What is claimed is:

1. An ultrasonic transducer for use in a fluid medium, comprising:
   at least one transducer core which has at least one piezoelectric transducer element; and
   at least one housing, the at least one housing having at least one housing opening at least partially sealed against the fluid medium with the aid of a sealing film which is connected to the at least one transducer core, the sealing film having at least one expansion deformation, the at least one expansion deformation being configured to permit a relative movement between the at least one transducer core and the at least one housing;
   wherein at least one annular gap is provided between the at least one housing and the at least one transducer core, the at least one gap being at least partially filled with at least one decoupling element, the at least one decoupling element being configured to dampen a transmission of structure-borne noise between the at least one housing and the at least one transducer core.

2. The ultrasonic transducer as recited in claim 1, wherein the at least one expansion deformation has at least one of the following deformations: an expansion fold extending into the fluid medium, an expansion fold extending into a housing interior of the housing, a bellows, and a step-shaped deformation, a first plane of the sealing film being transferred to a second plane of the sealing film in the step-like deformation.

3. The ultrasonic transducer as recited in claim 1, wherein at least one gap is provided between the at least one housing and the at least one transducer core, the at least one expansion deformation being provided at least partially in an area of the gap.

4. The ultrasonic transducer as recited in claim 1, wherein the sealing film is integrally connected to an edge of the at least one housing in an area of the at least one housing opening and to a radiation surface of the at least one transducer core.

5. The ultrasonic transducer as recited in claim 1, wherein the at least one decoupling element is connected to the sealing film in an area of the at least one expansion deformation.

6. The ultrasonic transducer as recited in claim 1, wherein the sealing film includes a plastic material made from at least one of the following materials: a Kapton, a polyetheretherketone, a Teflon, a perfluoroethylene propylene copolymer, a polyethylenenaphthalate, a liquid crystal polymer, and a polyphenylene sulfide.

7. The ultrasonic transducer as recited in claim 1, wherein the sealing film has a thickness of no more than 50 μm.

8. The ultrasonic transducer as recited in claim 7, wherein the sealing film has a thickness of no more than 25 μm.

9. A method for manufacturing an ultrasonic transducer for use in a fluid medium, comprising:
   introducing at least one transducer core which has at least one acoustic/electric transducer element into at least one housing, at least one housing opening being at least partially sealed against the fluid medium with the aid of a sealing film which is connected to the at least one transducer core, the sealing film having at least one expansion deformation, the at least one expansion deformation being configured to permit a relative movement between the at least one transducer core and the at least one housing;
   providing at least one gap between the at least one transducer core and the at least one housing, the at least one gap being at least partially filled with at least one decoupling element, the at least one decoupling element being configured to dampen a transmission of structure-borne noise between the at least one housing and the at least one transducer core, the at least one expansion deformation being at least partially provided when the at least one decoupling element is introduced into the gap.

10. The method as recited in claim 9, at least one of casting, pressing, and injecting at least one deformable compound into the at least one gap to introduce the at least one decoupling element.

11. The method as recited in claim 9, wherein the at least one decoupling element is connected to the sealing film in an area of the at least one expansion deformation.

12. The method as recited in claim 9, wherein the sealing film includes a plastic material made from at least one of the following materials: a Kapton, a polyetheretherketone, a Teflon, a perfluoroethylene propylene copolymer, a polyethylenenaphthalate, a liquid crystal polymer, and a polyphenylene sulfide.

13. The method as recited in claim 9, wherein the sealing film has a thickness of no more than 50 μm.

14. The method as recited in claim 13, wherein the sealing film has a thickness of no more than 25 μm.

* * * * *